United States Patent
Symens et al.

(10) Patent No.: US 7,087,209 B2
(45) Date of Patent: Aug. 8, 2006

(54) METHOD FOR PRODUCING A HALIDE BRINE

(75) Inventors: Raymond D. Symens, Spring, TX (US); Lyle H. Howard, West Memphis, AK (US); Surendra Kumar Mishra, The Woodlands, TX (US); Thomas William Polkinghorn, The Woodlands, TX (US)

(73) Assignee: Tetra Technologies, Inc., The Woodlands, TX (US)

( * ) Notice: Subject to any disclaimer, the term of this patent is extended or adjusted under 35 U.S.C. 154(b) by 398 days.

(21) Appl. No.: 10/407,417

(22) Filed: Apr. 4, 2003

(65) Prior Publication Data

US 2003/0198589 A1    Oct. 23, 2003

Related U.S. Application Data

(60) Provisional application No. 60/371,293, filed on Apr. 10, 2002.

(51) Int. Cl.
*C01D 3/04* (2006.01)
*C01D 3/06* (2006.01)
*C01D 3/10* (2006.01)

(52) U.S. Cl. .............. 423/491; 423/492; 423/493; 423/495; 423/497; 423/499.1; 423/499.3; 423/499.4

(58) Field of Classification Search .......... 423/489, 423/490, 491, 492, 493, 497, 499.1, 499.3, 423/499.4, 495
See application file for complete search history.

(56) References Cited

U.S. PATENT DOCUMENTS

| | | | |
|---|---|---|---|
| 1,775,598 A | 9/1930 | Meulen | |
| 1,863,375 A | 6/1932 | Jones | |
| 2,007,758 A | 7/1935 | Harlow | |
| 2,269,733 A | 1/1942 | Pearson | |
| 2,415,346 A | 2/1947 | Farr | |
| 3,431,068 A | 3/1969 | Burk | |
| 3,462,241 A | 8/1969 | Sedley | |
| 4,083,942 A | 4/1978 | Sanders | |
| 4,138,354 A | 2/1979 | Sochol et al. | |
| 4,248,850 A | 2/1981 | Keblys | |
| 4,514,374 A | 4/1985 | Kirsch | |
| 4,549,973 A * | 10/1985 | Kirsch | 507/277 |
| 5,230,879 A | 7/1993 | Beaver et al. | |
| 6,117,408 A * | 9/2000 | Howard et al. | 423/491 |
| 6,730,234 B1 * | 5/2004 | Symens et al. | 210/753 |

FOREIGN PATENT DOCUMENTS

GB            285915        9/1928

* cited by examiner

*Primary Examiner*—Ngoc-Yen Nguyen
(74) *Attorney, Agent, or Firm*—D'Ambrosio & Asso. PLLC; Jo Katherine D'Ambrosio

(57) ABSTRACT

A method for producing halide brine wherein an alkali and a reducing agent are added to an aqueous fluid having a density greater than 8.30 lb/gal., (0.996 kg/L) water, waste water or sea water for example. The resulting fluid is then contacted with a halogen to form a halide brine. The reaction occurs in a conventional reactor such as a mixing tank.

10 Claims, 1 Drawing Sheet

METHOD FOR PRODUCING A HALIDE BRINE

CROSS REFERENCES TO RELATED CASES

This is a continuation of U.S. Provisional Patent Application, Ser. No. 60/371,293 filed Apr. 10, 2002, now abandoned.

FIELD OF THE INVENTION

The present invention relates to a method for producing a halide brine. More specifically the invention relates to a method for producing a halide brine in a conventional reactor.

BACKGROUND OF THE INVENTION

Halide brines are commonly used in industry for various applications, drilling fluids, textile treatment, photographic emulsion, cooling systems, deicing, and dust control, for example. In the past, the production of halide brines typically required production of intermediate halide acids. The production of halide acid from halogen and hydrogen requires expensive equipment.

The process of preparing metal bromides from free metals and bromine has been reported in patent literature. For example, U.S. Pat. No. 4,138,354 discloses a process for preparing manganese bromide and cobalt bromide from elemental manganese, cobalt bromide, and bromine. The process depends upon an oxidation-reduction reaction between manganese and the cobaltous ion and the subsequent reaction of the generated cobalt with aqueous bromine. U.S. Pat. No. 4,514,374 teaches the use of a lower alkanol as a reducing agent.

U.S. Pat. No. 4,248,850 teaches the preparation of metal bromides from a basic metal compound and bromine in the presence of formaldehyde as a reducing agent. While this method affords certain advantages over prior art processes that use nitrogen-containing organic or inorganic compounds as reducing agents, namely the elimination of foaming problems due to the liberation of nitrogen gas formed during the reaction, the use of formaldehyde as a reductant often results in the presence of unreacted formaldehyde in the product mixture which is difficult to remove and thereby adds to the cost of producing the desired metal bromide products.

U.S. Pat. No. 3,431,068 discloses a method of preparing alkali metal halides by reacting an alkali metal hydroxide with an elemental halogen in a liquid (saturated aliphatic or alicyclic alcohol or ketone, or a saturated aliphatic aldehyde). U.S. Pat. No. 5,230,879 discloses a process for reducing metal halates to metal halides by reacting a metal halate with a reducing agent in an aqueous alkaline reaction medium having a pH above about 7, wherein the amount of reducing agent is sufficient to reduce substantially all of the metal halate to metal halide.

British specification No. 285,915 describes the preparation of calcium bromide by reacting a "non-acid" calcium compound (i.e. calcium oxide, hydroxide, and/or carbonate) with bromine in the presence of a reducing agent which is converted to gas and/or water. The patent describes several reaction sequences, among which are addition of the metal salt to a reaction medium comprising reducing agent, bromine, and water; and the addition of an aqueous solution of metal salt and reducing agent to an aqueous bromine reaction medium.

Similarly, U.S. Pat. No. 1,775,598 has a related disclosure to the '915 British patent. The '598 discloses the use of reducing agents which are converted into water and/or gases. These may be nitrogen-containing organic or inorganic compounds such as urea, cyanamide, ammonia, ammonium carbonate, ammonium bicarbonate, formamide, carbamates, and ammonium cyanide; or easily decomposable organic acids such as formic or oxalic acid; or ammonium or metal derivatives of these compounds (e.g. calcium nitride, metal formates, or oxalates).

U.S. Pat. Nos. 1,863,375 and 2,007,758 broadly relate to a process for preparing metal bromides employing ammonia to retard the formation of bromate and hypobromite. The '375 patent relates to the recirculation of aqueous ammonia containing metal salt solution through a tower absorber in which it is exposed to bromine vapor. While the '758 patent relates to the same general process, it is specifically concerned with a means for recovering the spent ammonia evolved from the reaction mixture. Both the patents relate to the use of ammonia as the reducing agent.

U.S. Pat. No. 2,269,733 describes the reaction of an alkali or alkaline metal compound with bromine in the presence of one of a variety of reducing agents involving several alternative reaction sequences. For example, the simultaneous addition of bromine and metal salt to another liquor, with an excess of reducing agent preferably being employed. In an alternative reaction, a two step process in which ammonia and bromine are first reacted in the presence of a mother liquor to form ammonium bromide, with the metal salt thereafter being added together with additional bromine.

U.S. Pat. No. 4,083,942 discloses the use of formic acid as a reactant, and illustrates the process with the following equation:

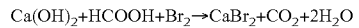
$$Ca(OH)_2 + HCOOH + Br_2 \rightarrow CaBr_2 + CO_2 + 2H_2O$$

In the '942 process, bromine and the alkaline compound are alternatively and incrementally added to an aqueous mixture of formic acid and a less than equivalent amount of metal compound, while maintaining the pH below 7.0.

U.S. Pat. No. 3,462,241 relates to the reaction of lime and bromine in the absence of a reductant:

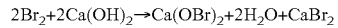
$$2Br_2 + 2Ca(OH)_2 \rightarrow Ca(OBr)_2 + 2H_2O + CaBr_2$$

U.S. Pat. No. 2,415,346 discloses a process of making halogen salts of metals. Zinc bromide is made by reacting zinc chloride with hydrobromic acid under boiling temperature conditions. In the '346 process of making metal bromides, a metal salt of the type $MY_n$ is reacted with an aqueous medium of hydrogen bromide, where M is the desired metal, Y is a halogen of lower atomic weight than bromine, and n is the valence of M. The metal salt is treated with a substantially equivalent quantity of the acid in an aqueous solution with sufficient water to form a constant boiling mixture.

A problem of the high cost of production of intermediate halides during the formation of halide brines exists. The formation of these halide acids from hydrogen and halogen requires expensive capital equipment.

SUMMARY OF THE INVENTION

The present invention relates to an inexpensive and simple method for rapidly manufacturing halide brines in large commercial quantities using conventional equipment. In one preferred method for producing halide brine, an alkali and a reducing agent are added to an aqueous fluid having a density greater than 8.30 lb/gal. (0.996 kg/L), water, sea water or waste water for example. A reducing agent can be in liquid form or in gaseous state that goes into solution when added to the aqueous fluid. The resulting liquid is contacted with a halogen to form a halide brine. Typical halogens used in the process of making the more useful brines are chlorine and bromine to produce the commonly used chloride and bromide brines. This invention eliminates the additional costs that are associated with the production of intermediate halide acids.

The aqueous fluid comprises water from various sources, essentially pure water, tap water, sea water, river water, pond water, standing water, waste water, brackish water, or combinations thereof. Preferably, the water is a clear water. The alkali can be selected from alkali metal hydroxides, alkali earth metal oxides, alkali earth metal hydroxides, base metal oxides, base metal hydroxides, and a combination thereof. Preferably, the metal source of the base metal oxides and base metal hydroxides is selected from iron, zinc, copper, nickel, cadmium, cobalt, aluminum, manganese, chromium, and combinations thereof. The earth metal source of the alkali earth metal oxides and alkali earth metal hydroxides can be selected from calcium, magnesium, strontium and combinations thereof. In one aspect, the reducing agent can be ammonia. Alternatively, the reducing agent can be acetaldehyde. An alternative reducing agent can be acetic acid.

Preferably, the method of this invention takes place in a conventional reactor, wherein a halogen is converted directly to a halide brine eliminating the need for producing an intermediate halide acid. Often, solids are present in the initial aqueous fluid stream such as waste waters. The preferred method comprises a further step of separating suspended solids from the beginning fluid prior to entering the reactor. Alternatively, the step of separating suspended solids from the final fluid can occur at the end of the reaction process. In still another alternative method, separation of suspended solids occurs both prior to the aqueous fluid entering the reactor as well as after the reacted fluid leaves the reactor. The separation of suspended solids from the fluid can be performed in a variety of separators including a gravity filter, a clarifier, a centrifuge, a vacuum filter or a pressure filter. Any suspended solids within the final halide brine fluid can be separated from the fluid after the halogen has reacted with the reaction fluids by know separation techniques.

An alternative method for producing halide brine comprises adding an alkali to an aqueous fluid having a density greater than 8.30 lb/gal. (0.996 kg/L.) A reducing agent is then added to the resulting fluid and the combined mixture of alkali, reducing agent and aqueous fluid is contacted with a halogen to form a halide brine. Alternatively, the reducing agent is added first to the aqueous fluid and then the alkali is charged into the reactor. The resulting fluid is contacted with halogen to form a halide brine. Preferably, these steps are performed in a conventional reactor.

BRIEF DESCRIPTION OF DRAWING

The FIGURE illustrates a schematic of a halogen brine reactor system.

DETAILED DESCRIPTION OF INVENTION

Figure 1:
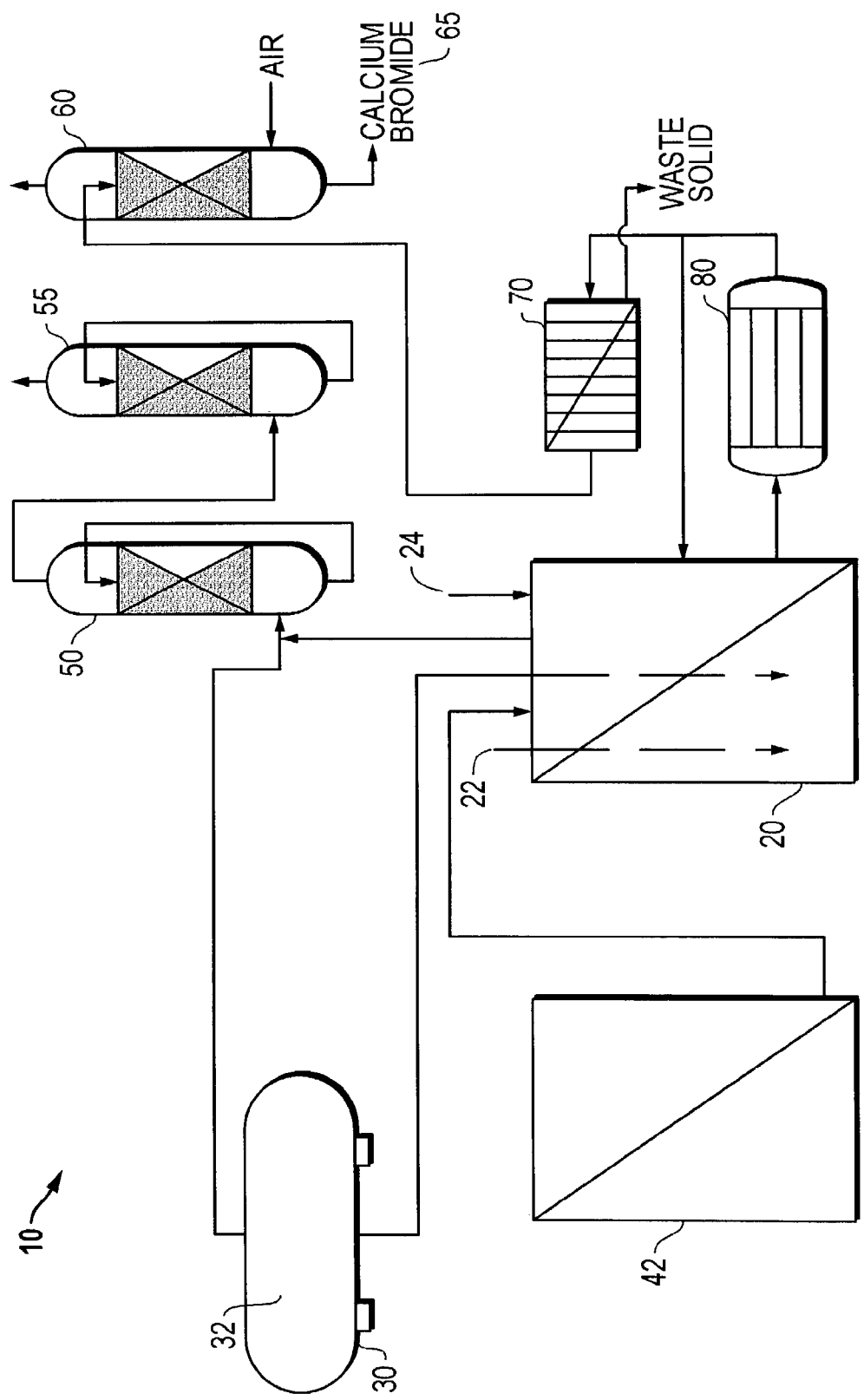

The present invention relates to an innovative method for the direct conversion of a halogen to a halide brine in a conventional reactor such as a simple mixing tank. The production of halide brines according to previous methods required the production of halide acid by reacting hydrogen and halogen thereby necessitating expensive equipment. Advantageously, in the present invention, the stage of producing intermediate halide acids is eliminated. The method of this invention can be used to produce a variety of halide brines, calcium chloride or calcium bromide for example, using a conventional reactor, from various halogens including but not limited to bromine, chlorine and iodine. For illustration purposes only, without limiting the scope of this inventive method, the description of the schematic refers to the production of calcium bromide.

Referring to the FIGURE, the schematic illustrates one preferred method of this invention using bromine as the halogen. An aqueous fluid 22 having a density greater than 8.30 lb/gal. (0.996 kg/L), water for example, is charged into a conventional reactor 20. The aqueous fluid can comprise water from various sources, essentially pure water, tap water, sea water, river water, pond water, standing water, waste water from process plants, brackish water, or combinations thereof. Sea water is one preferred aqueous fluid, particularly in the formation of high density brines used for drilling fluids. Preferably, the aqueous fluid is a clear water. If the water is not clear, a separator can be used to separate suspended solids from the beginning fluid prior to entering the reactor 20. Alternatively, separating suspended solids from the final fluid can occur at the end of the reaction process or, if necessary because of "dirty" water, both prior to the reaction and after the halogen brine is produced.

In one preferred method for producing halide brine as illustrated by the FIGURE, an alkali 24 (lime is used in the example depicted in the schematic) is added to the aqueous fluid 22 in a conventional reactor. The alkali 24 can be selected from alkali metal hydroxides, alkali earth metal oxides, alkali earth metal hydroxides, base metal oxides, base metal hydroxides, and combinations thereof. In one aspect, the alkali metal hydroxides can be selected from sodium hydroxide and potassium hydroxide. Preferably, the metal source of the base metal oxides and base metal hydroxides is selected from iron, zinc, copper, nickel, cadmium, cobalt, aluminum, manganese, chromium, and combinations thereof. The metal source of the alkali earth metal oxides and alkali earth metal hydroxides can be selected from calcium, magnesium, strontium, and combinations thereof. In one preferred method, the alkali is in an aqueous fluid form, a lime slurry for example, as shown in the schematic.

A reducing agent 42, ammonia for example, is added to the aqueous fluid 22 in the reactor 20, either after the addition of the alkali or simultaneously along with the alkali 24. In an alternative embodiment, the reducing agent 42 can be acetaldehyde. Another alternative reducing agent is acetic acid. The reducing agent can be in liquid form or a gaseous form that enters into solution upon being charged to the conventional reactor. In one preferred embodiment, the reducing agent is in a liquid form, such as aqueous ammonia.

Once the alkali 24 and the reducing agent 42 are combined with the aqueous fluid 22 within the reactor 20, the resulting mixture is contacted with a halogen 32; bromine is shown in the schematic. The halogen 32 is charged from a storage tank 30 to the conventional reactor 20 to combine with the alkali 24 and reducing agent 42 to form a halide brine 65, calcium bromide for example. Typical halogens used in the process of making the more useful brines are chlorine and bromine to produce the commonly used chloride and bromide brines. In some preferred embodiments, the halogen is added until the resulting fluid has a density of at least 8.5 lb/gal (1.021 kg/L) The selection of the specific alkali, reducing agent and halogen depends on the final required density of the halide brine. The choice of aqueous fluid, alkali, reducing agent, and halogen, as well as, the concentrations of each of these chemicals in the starting solutions is determined by the required density of the final product. As seawater, readily available in offshore operations, comprises a density greater than tap water, it is a good aqueous fluid source to produce brine of final density greater than 9.0 lb/gal. (1.08 kg/L.)

Advantageously, the reactor used in this method is a conventional reactor. In one embodiment of the method of this invention, the halogen used is chlorine. The mixture of aqueous fluid, alkali, and reducing agent in the conventional reactor is contacted with chlorine to increase the density to at least 8.5 lb/gal. (1.021 kg/L). In a preferred embodiment using bromine as the halogen, the fluid is contacted with bromine to increase the density to at least 10.0 lb/gal. (1.20 kg/L). Again, any suspended solids can be separated from the resulting fluid by conventional means.

In another embodiment of the method of this invention, the halogen used is bromine. The alkali can be lime added to a water having a density greater than 8.30 lb/gal. (0.996 kg/L.) The reducing agent selected for this process is ammonia. The mixture of water lime and ammonia in the conventional reactor is contacted with bromine to increase the density to at least 10.0 lb/gal. (1.20 kg/L). In most preferred embodiments of this method using bromine as the halogen and other alkali or reducing agents, the fluid is contacted with bromine to increase the density to at least 10.0 lb/gal. (1.20 kg/L). Again, any suspended solids can be separated from the resulting fluid by conventional means.

Referring to the FIGURE, both the bromine storage tank 30 and the reactor 20 vent to one or more scrubbers 50, 55 to scrub or remove any small amounts of free gases that may occur, bromine or ammonia, for example.

Although the method of this invention does not depend on any specific temperature range, both bromine and chlorine reactions are exothermic and increase the temperature in the reactor. Preferably, a heat exchanger 80 is used to cool the reaction fluids so that optimum temperatures are maintained to produce the desired halide brine and minimize evaporation of bromine or chlorine. When bromine is added to alkali/reducing agent aqueous mixture as in the examples set out below, the temperature can easily increase to higher than 150° F. (65.6° C.) instantaneously. Use of the heat exchanger 80 to cool the reaction fluids helps to minimize losses due to evaporation.

In one embodiment of this method, the method of producing a halide brine comprises adding an alkali to an aqueous fluid having a density greater than 8.30 lb/gal. (0.996 kg/L). The alkali is selected from alkali metal hydroxides, alkali earth metal oxides, alkali earth metal hydroxides, base metal oxides, base metal hydroxides, and a combination thereof. A reducing agent is then added while maintaining the temperature at 68° F. (20° C.) or above; the reducing agent is selected from a group consisting of ammonia, acetaldehyde, acetic acid, and combinations thereof. The fluid resulting from mixture of alkali, aqueous fluid having a density greater than 8.30 lb/gal., and reducing agent is contacted with a halogen to increase the density to at least 8.5 lb/gal. (1.021 kg/L). As in the previously described embodiments, this reaction is performed in a conventional reactor.

The method of producing halide brines according to this invention can be a batch process or a continuous process. When halide brine production is a batch process, predetermined amounts of raw materials are added into the reactor to produce a fixed amount of the halide brine, calcium bromide for example. When the reactions are complete, the product is removed from the reactor before adding the raw materials for the next batch. In the batch process, additional lime 24 may be added as bromine or other halogen is charged. The additional alkali 24 is carefully added to control the reaction so that substantially all the halogen is consumed within the reactor. In a continuous process, the charge of alkali, reducing agent, halogen and additional alkali 24 is carefully monitored and controlled throughout the process for the same reason. Preferably, both the pH and the oxidation-reduction potential (ORP) are also monitored so that the end product is within the target pH and ORP for the halide brine being produced. Often, suspended solids are present in both the initial aqueous fluid stream such as dirt, in waste waters, as well as, the end product which may also have unconsumed alkali or un-reacted materials. One preferred method comprises the separation of suspended solids both prior to the aqueous fluid entering the reactor, as well as, after the reacted fluid leaves the reactor. The separation of suspended solids from the fluid can be performed in various separators 70 including a gravity filter, a clarifier, a centrifuge, a vacuum filter or a pressure filter. Referring to the schematic, in one preferred method, the resulting halide brine 65 is cooled down in the heat exchanger 80 and then residual solids are removed using a separator or filter 70 prior to being sent to a stripper 60 to remove any residual ammonia.

In one preferred method of this invention, calcium bromide is produced by combining hydrated lime and ammonia in an aqueous fluid and then reacting elemental bromine with the resulting mixture. The reactions that take place are exothermic reactions generating large amounts of heat. This excess heat can be removed by a heat exchanger system.

In an another preferred method of producing a high density bromide brine, lime and ammonia are added to an aqueous fluid having a density greater than 8.30 lb/gal. (0.996 kg/L). After the lime and ammonia are mixed, bromine is charged into the reactor 20 to increase the density to at least 9.0 lb/gal. (1.081 kg/L). Additional lime may be added to consume excess bromine and the reaction fluids may be cooled down by recycling them through a heat exchanger. Finally, any suspended solids are separated from the desired end product, calcium bromide, by a filter and stripped of any excess ammonia in a stripper.

During another alternative method of producing a halide brine, an alkali is charged to sea water in a conventional reactor such as a mixing tank. A reducing agent can be charged to the reactor and the resulting mixture of alkali, reducing agent and sea water contacted with a halogen to increase the density to at least 9.0 lb/gal. (1.081 kg/L). Any suspended solids can be separated from the resulting halide brine.

EXAMPLE

Pilot Plant
  Product: Calcium Bromide from Bromine

Process Overview

Calcium bromide production in this test was a batch process, meaning that predetermined amounts of raw materials were added to the reactor in a stepwise fashion to produce a fixed amount of calcium bromide. When the reactions were complete, the product was removed from the reactor before adding the raw materials for the next batch.

II. Operating Procedure

Due to the 'batch processing' nature of the operation, initial start-up, normal operations and shut downs are integral part of each batch operation, and therefore are not addressed specifically as separate procedures.

The bromine scrubber system was checked to be running. The damper valve to the reactor vent was opened to the scrubber system.

1370 gal. (5,185 L) water was charged to a conventional mixing tank (reactor), a 4500 gal. (17,032 L) capacity agitated tank plus recycling pump was used.

Agitator was started.

The hydrated lime controller was set for 9,310 lb (4,232 kg) hydrated lime addition. The rotary valve speed control was set at 6 and the conveyer speed control at 6–7.

953 gal. (7,105 lb) (3229 kg) of 20% ammonia water was charged at eight gpm (30.28 Lpmin) from the aqueous ammonia storage tank to the reactor.

1,000 Lb. (455 kg) of lime was charged to reactor before starting bromine charge. The bromine pump was turned on and set to deliver 9500 Lb. (4,318 kg) of bromine per hour.

When the reactor temperature reached 150° F. (65.6° C.) the coolant system was activated in preparation for cooling the batch in the reactor.

The bromine addition rate was adjusted to maintain batch color of light yellow with excess lime present. When the color went to red, the bromine pump was shut off and the lime charge was allowed to catch up to the bromine charge.

When the reactor temperature reached 180° F. (82.2° C.) the heat exchanger system was started by:

A. Beginning flow of coolant through the heat exchanger and running cooling fans.

B. Starting flow of raw product from the reactor through the heat exchanger and closing the recycle line to the reactor. The average flow rate of the raw product from to the heat exchangers was maintained in the range of 100–150 gpm (379–568 L/min).

The reactor temperature was maintained at 185° F.–210° F. (85° C.–100° C.) by pumping the reactor contents through the heat exchanger. When the temperature rose above 210° F. (100.0° C.), the bromine addition pump was shut off. The bromine pump was turned back on when the temperature dropped below 195° F. (90.6° C.).

After bromine charge (18,959 Lb., 8,618 kg) and lime charge (9,310 Lb., 4,232 kg) were completed, the batch was sampled.

Hydrated lime was added to the reactor to bring the pH to 7.0–8.0 (10:1 dilution). About 20 min after adding lime, a sample was taken from the reactor to determine if the filtrate appeared clear white to slightly cloudy white and did not have an ammonia odor. Also, no yellow color was observed and the oxidation/reduction potential (ORP) was less than 200 mV. The final product was within its target pH and specific gravity range.

If the specific gravity of the product solution in the reactor had been higher than the specified value, the product would have been diluted with water at this stage to prevent any crystallization in the reactor.

The heat exchanger was run until product temperature dropped to 150° F. (65.6° C.). If the product had required evaporation, the solution would have been pumped to the evaporator tank without further cooling.

The heat exchanger system was turned off, first shutting the raw product flow from tank to the heat exchanger by closing the valve next to reactor. The coolant flow to the heat exchangers was turned off by turning pump off when the coolant glycol reached ambient temperature. Then the cooling fans were turned off.

Calcium bromide product was pumped from reactor tank to the evaporation tank. Agitator was turned off when the tank level reached 1000 gal. (3,785 L).

The target density for filtered and cooled sample from the reactor was obtained.

When product in the reactor reached the target density, it was ready for filtration. Filtration was continued until the filtered product was clear.

---

CALCIUM BROMIDE BATCH LOG SHEET-Bromine

BATCH NO.: 1
START DATE: Feb. 11, 2002   FINISH DATE: Feb. 11, 2002
START TIME: 07:45   FINISH TIME: 17:45
SHIFT   A   B   C   D

**Reactor Vent to Scrubber OPEN X

Initial Water Charge: Target 1376 gal. (5,208 L), Actual 1,376 gal. (5,208 L)

Ammonia Charge: Target 953 gal. (3,607 L) Actual 953 gal. (3,607 L)

Lime Charge: Target 9,310 lbs. (4,232 kg) Actual 9,310 lbs. (4,232 kg)

Bromine Charge: Target 18,959 lbs (8,618 kg) Actual 18,960 lbs. (8600 kg)

---

METHOD FOR PRODUCING A HALIDE BRINE

Adjustments

| Bromine (lbs., kg) | LIME (lbs., kg) | Ammonia (gal., L) |
|---|---|---|
| 0 | 0 | 50 Gal. (56 L/cm)(B) |

Batch Total

Bromine:   18,960 lbs. (8,618 kg)
Lime:   9,310 lbs. (4,232 kg)   pH −8.73 (STRAIGHT)
Ammonia:   1,003 Gal. (3796.8 L)   pH −12.28
Dilution Water 0 inches (cm) 0 gal (L) @ 38 gal/inch, (56 L/cm)
Final pH   Straight pH 8.73   pH (10:1) 12.28
Final Density:   14.52 (1.744 kg/L)
Final ORP:   not measured · (Maximum 200)

CALCIUM BROMIDE BATCH LOG SHEET-Bromine

BATCH NO. 1
START DATE: Feb. 12, 2002   FINISH DATE: Feb. 12, 2002
START TIME: 07:45   FINISH TIME: not recorded
SHIFT   A   B   C   D
**Reactor Vent to Scrubber OPEN _____

Initial Water Charge:   Target 1376 gal. (5,208 L) Actual 1,376 gal. (5,208 L)
Atomic Charge:   Target 953 gal. (3,607 L) Actual 970 gal. (3,671 L)
Lime Charge:   Target 9,310 lbs. (4,232 kg) Actual 8,250 lbs. (3,750 kg)
Bromine Charge:   Target 18,959 lbs. (8,618 kg) Actual 18,960 lbs. (8,618 kg)

Adjustments

| Bromine (lbs., kg) | LIME (lbs., kg) | Ammonia (gal., L) |
|---|---|---|
| 0 | 0 | 50 Gal. (189 L) (B) |
| 0 | 0 | 45 Gal. (170 L) (A) |
| 0 | 0 | 65 Gal. (246 L) (B) |

Batch Total

Bromine:   18,960 lbs (8,618.2 kg).
Lime:   8,250 lbs. (3750 kg)
Ammonia:   1,130 Gal. (4,277 L)
Dilution Water 00 inches (cm) 00 gal (L) @ 38 gal/inch (56 L/cm)
Final pH   Straight pH __not recorded   pH (10:1) not recorded

| METHOD FOR PRODUCING A HALIDE BRINE | |
|---|---|
| -continued | |
| Final Density: | 14.67 (1.762 kg/L) |
| Final ORP: | not measured (Maximum 200) |

The foregoing description is illustrative and explanatory of preferred embodiments of the invention, and variations in the size, shape, materials and other details will become apparent to those skilled in the art. It is intended that all such variations and modifications which fall within the scope or spirit of the appended claims be embraced thereby.

The invention claimed is:

1. A method for producing a halide brine comprising:
   a. adding an alkali to an aqueous fluid having a density greater than 8.30 lb/gal. (0.996 kg/L);
   b. adding an acetic acid reducing agent;
   c. contacting the resulting fluid from step (b) with a halogen to form a second halide fluid;
   wherein the reaction is performed in a conventional reactor.

2. A method of producing a halide brine comprising:
   a. adding an alkali to sea water;
   b. adding a reducing agent; and
   c. contacting the fluid resulting from step (b) with a halogen to increase the density to at least 9.0 lb/gal. (1.081 kg/L), wherein the reaction is performed in a conventional reactor; and
   d. separating any suspended solids from the fluid resulting from step (c).

3. A method of producing a chloride brine comprising:
   a. adding lime to sea water;
   b. adding ammonia; and
   c. contacting the fluid resulting from step (b) with chlorine to increase the density to at least 9.0 lb/gal. (1.081 kg/L);
   wherein the reaction is performed in a conventional reactor.

4. A method of producing a halide brine comprising:
   a. adding an alkali to sea water;
   b. adding a reducing agent; and
   c. contacting the fluid resulting from step (b) with a halogen to increase the density to at least 9.0 lb/gal. (1.081 kg/L); and
   d. separating any suspended solids from the fluid resulting from step (c);
   wherein the reaction is performed in a conventional reactor.

5. A method of producing a halide brine comprising:
   a. adding an alkali to sea water;
   b. adding a reducing agent; and
   c. contacting the fluid resulting from step (b) with a halogen to increase the density to at least 10.0 lb/gal. (1.20 kg/L), wherein the reaction is performed in a conventional reactor; and
   d. separating any suspended solids from the fluid resulting from step (c).

6. A method for producing a halide brine comprising:
   a. adding an alkali and an acetic acid reducing agent to an aqueous fluid having a density greater than 8.30 lb/gal (0.996 kg/L); and
   b. contacting the resulting fluid from step (a) with a halogen to form a halide brine;
   wherein the reaction is performed in a conventional reactor.

7. A method of producing a halide brine comprising:
   a. adding an alkali to brackish water;
   b. adding a reducing agent; and
   c. contacting the fluid resulting from step (b) with a halogen to increase the density to at least 9.0 lb/gal. (1.081 kg/L), wherein the reaction is performed in a conventional reactor; and
   d. separating any suspended solids from the fluid resulting from step (c).

8. A method of producing a chloride brine comprising:
   a. adding lime to brackish water;
   b, adding ammonia; and
   c. contacting the fluid resulting from step (b) with chlorine to increase the density to at least 9.0 lb/gal. (1.081 kg/L);
   wherein the reaction is performed in a conventional reactor.

9. A method of producing a halide brine comprising:
   a. adding an alkali to brackish water;
   b. adding a reducing agent; and
   c. contacting the fluid resulting from step (b) with a halogen to increase the density to at least 9.0 lb/gal. (1.081 kg/L); and
   d. separating any suspended solids from the fluid resulting from step (c);
   wherein the reaction is performed in a conventional reactor.

10. A method of producing a halide brine comprising:
    a. adding an alkali to brackish water;
    b. adding a reducing agent; and
    c. contacting the fluid resulting from step (b) with a halogen to increase the density to at least 10.0 lb/gal. (1.20 kg/L), wherein the reaction is performed in a conventional reactor; and
    d. separating any suspended solids from the fluid resulting from step (c).

* * * * *